J. R. GETSINGER.
COTTON CHOPPER.
APPLICATION FILED SEPT. 9, 1908.

952,443.

Patented Mar. 22, 1910.
4 SHEETS—SHEET 1.

Witnesses
Jos. H. Blackwood
Walter O. Blackwood

Inventor
Jesse Robert Getsinger
By James K. Polk
Attorney

J. R. GETSINGER.
COTTON CHOPPER.
APPLICATION FILED SEPT. 9, 1908.
952,443.
Patented Mar. 22, 1910.
4 SHEETS—SHEET 2.
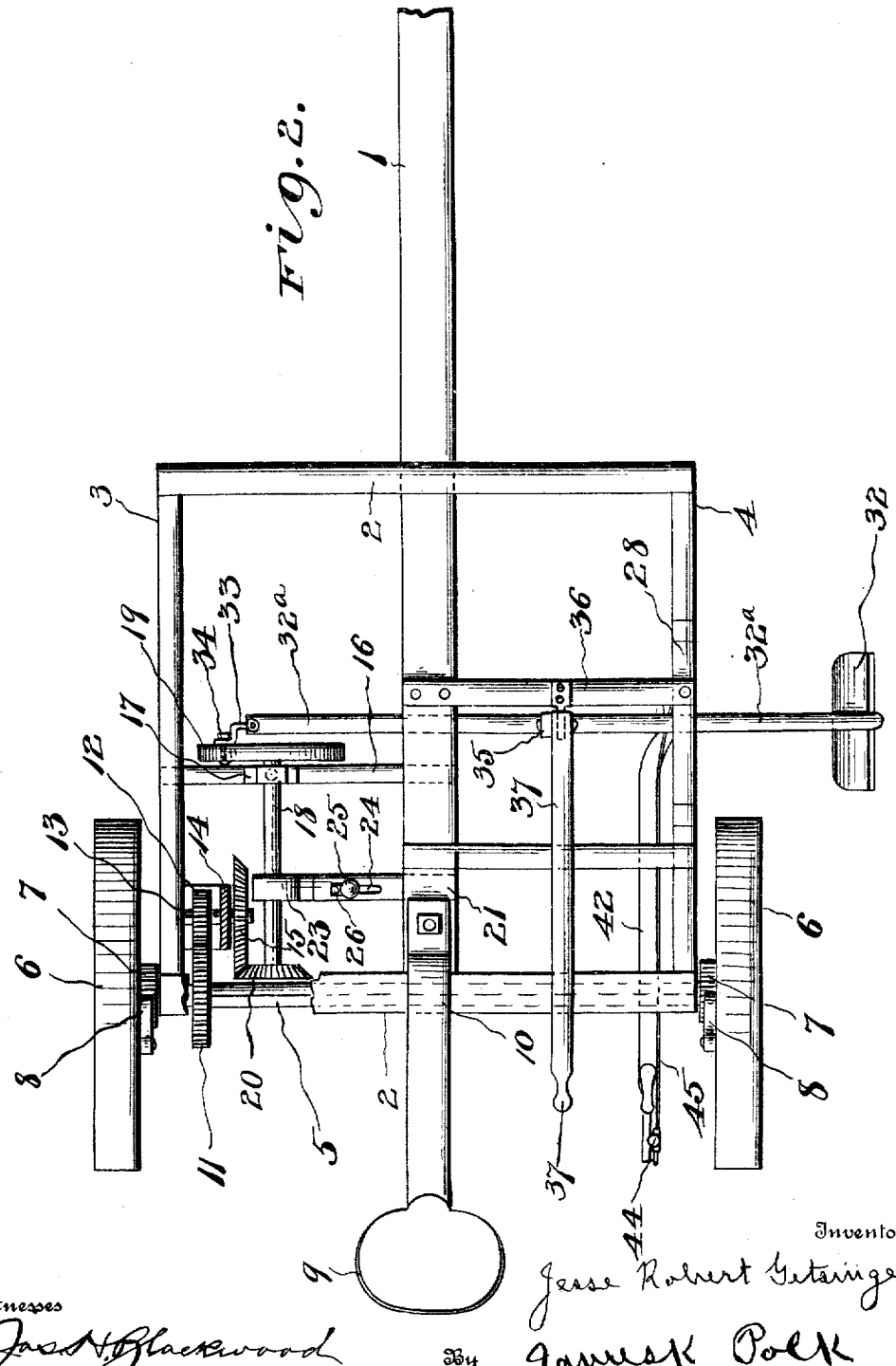
Witnesses
Jas H Blackwood
Walter O Blackwood
Inventor:
Jesse Robert Getsinger
By James K Polk
Attorney

J. R. GETSINGER.
COTTON CHOPPER.
APPLICATION FILED SEPT. 9, 1908.

952,443.

Patented Mar. 22, 1910.
4 SHEETS—SHEET 3.

Witnesses
Jas. H. Blackwood,
Walter O. Blackwood.

Inventor:
Jesse Robert Getsinger
By James K. Polk
Attorney

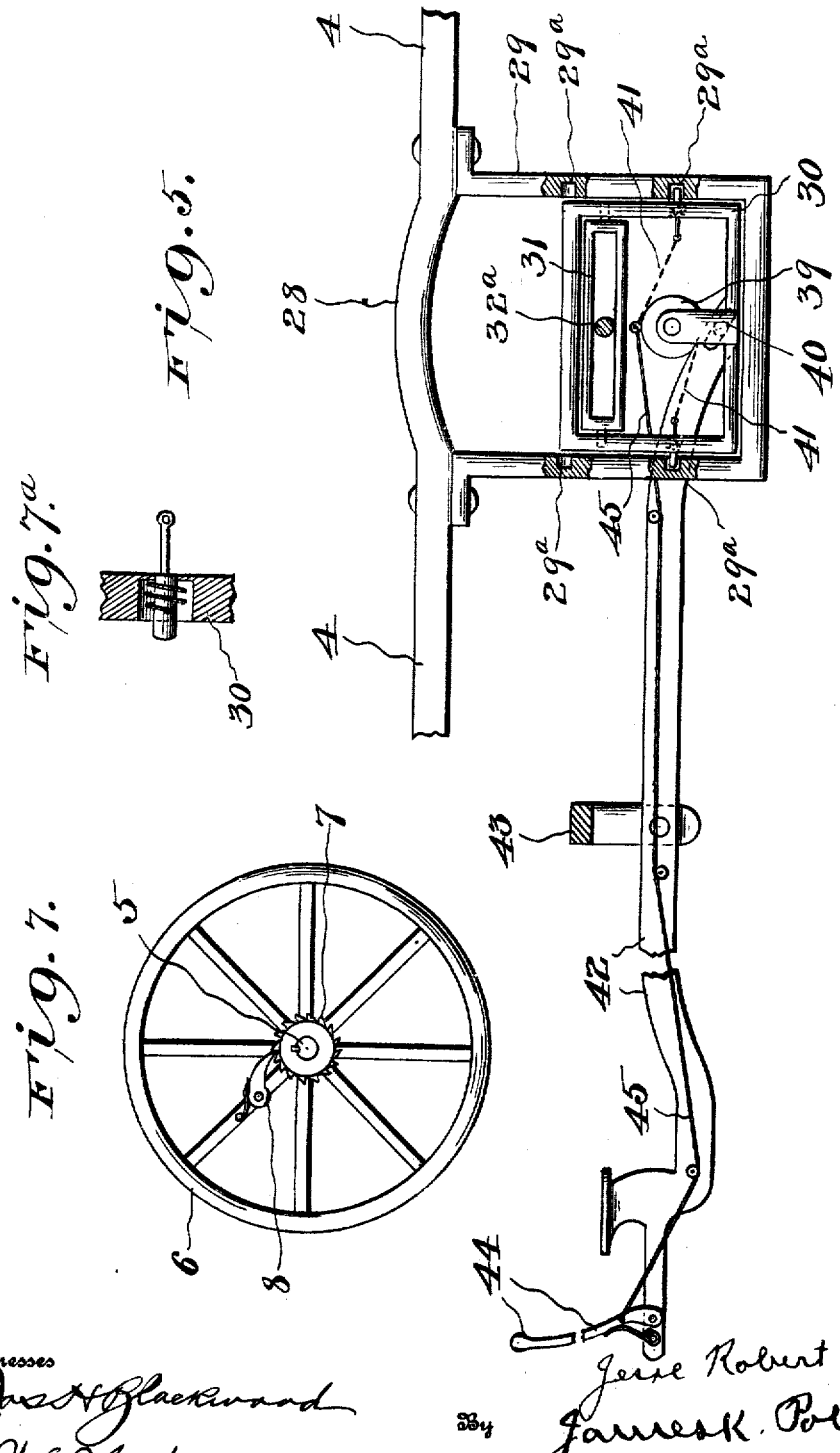

UNITED STATES PATENT OFFICE.

JESSE ROBERT GETSINGER, OF LEVEL LAND, SOUTH CAROLINA.

COTTON-CHOPPER.

952,443.  Specification of Letters Patent.  Patented Mar. 22, 1910.

Application filed September 9, 1908. Serial No. 452,167.

*To all whom it may concern:*

Be it known that I, JESSE ROBERT GETSINGER, a citizen of the United States, and a resident of Level Land, in the county of Abbeville and State of South Carolina, have invented certain new and useful Improvements in Cotton-Choppers, of which the following is a specification.

My invention relates to machines for thinning growing plants, such as cotton, and has for its object the provision of a wheeled machine having a hoe mounted thereon and geared to the wheels so that it is reciprocated, and the plants are cut out of the row. The hoe is at all times under the control of the operator, so that it can be moved up and down to throw it out of and into operation and from side to side to cut out the thick growth of the plants.

My invention will be described in detail hereinafter, and illustrated in the accompanying drawings, in which—

Figure 1:
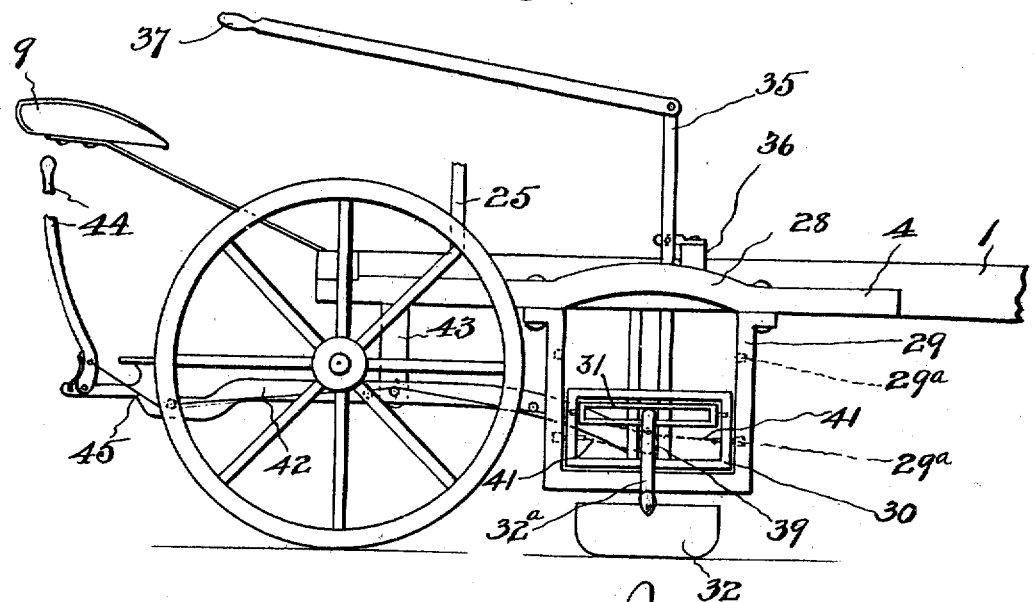
Figure 4:
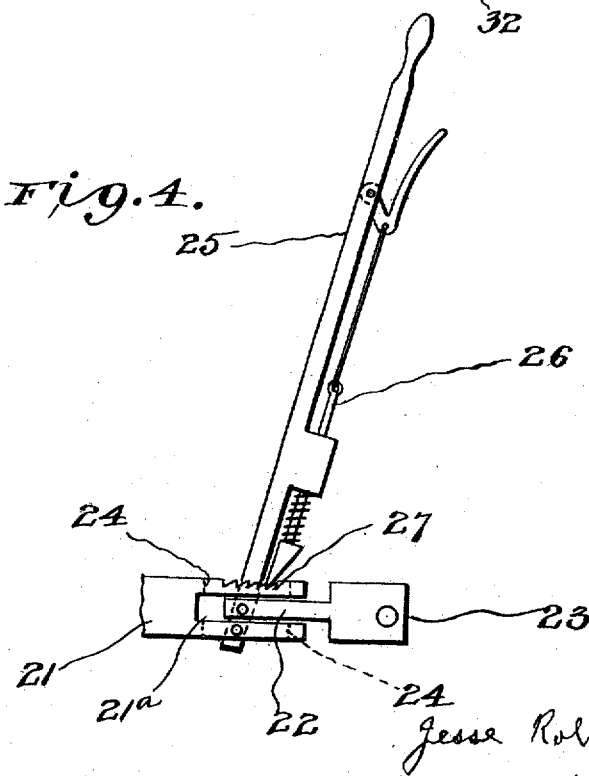
Figure 3:
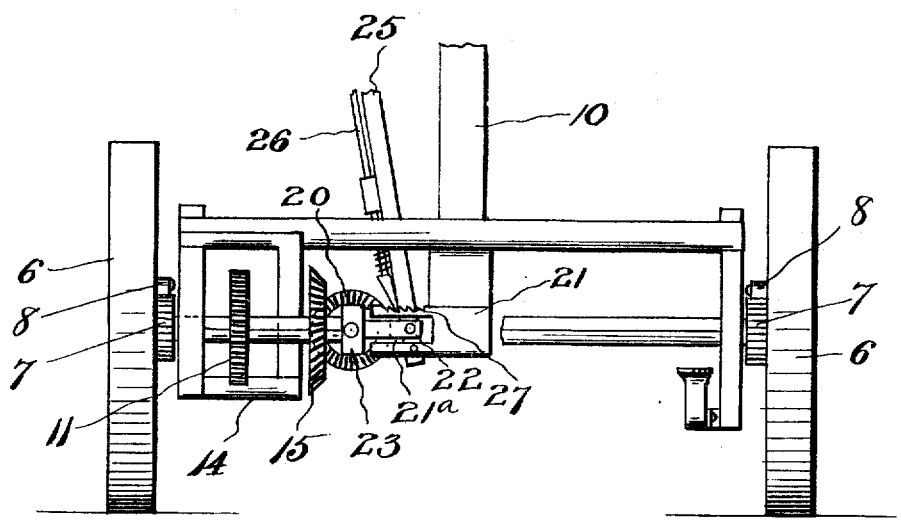
Figure 6:
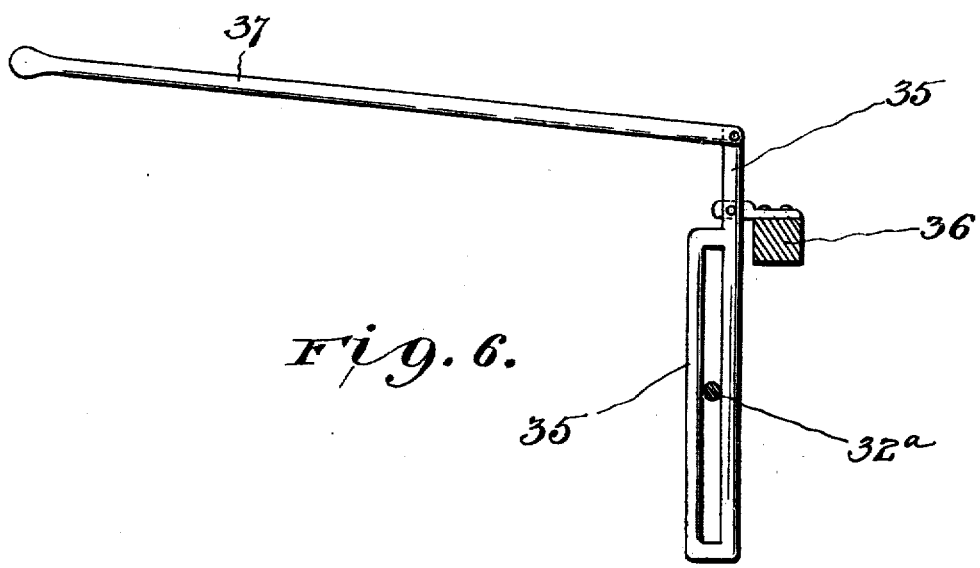

Figure 1 is a side view of my improved cotton chopper; Fig. 2, a top plan view; Fig. 3, a rear view; Fig. 4, an enlarged detail view of the mechanism for throwing the gearing into and out of gear; Fig. 5, a detail view of the mechanism for raising and lowering the hoe; Fig. 6, a detail view of the mechanism for moving the hoe from side to side; Fig. 7ª, a detail sectional view of one of the spring-bolts mounted in the vertically-moving hoe-frame; and Fig. 7, a view of the traction wheels with the shaft in section.

In the drawings similar reference characters indicate corresponding parts in all of the views.

1 indicates the draft pole on which are secured transverse beams 2, and secured to their ends longitudinal beams 3 and 4, forming the side pieces of the rectangular frame.

5 indicates the axle, which is journaled at the rear of beams 3 and 4, and has the traction-wheels 6 loosely mounted thereon. A ratchet-wheel 7 is secured to axle 5, adjacent to each traction-wheel 6, and a spring-pawl 8, mounted on each wheel 6, engages the ratchet-wheel 7, this construction insuring the rotation of axle 5 when the machine is drawn forward, but when backed permits the wheels to rotate loosely on the shaft, so that the mechanism, hereinafter described, is not operated except when the machine is drawn in a forward direction.

The seat 9 for the operator is mounted on a standard 10, secured at the rear of draft-pole 1.

11 indicates a gear-wheel keyed to axle 5, that meshes with a gear-pinion 12, keyed to shaft 13, journaled on side beam 3 and a frame 14, secured to said side beam.

15 indicates a beveled gear-wheel secured to the end of shaft 13.

16 indicates a beam connecting draft-pole 1 and beam 3, having a journal-box 17 pivotally secured thereon, in which is journaled a shaft 18, having a disk 19 secured on its forward end and a beveled pinion 20 keyed thereto that meshes with beveled gear-wheel 15.

21 indicates a block secured to draft-pole 1, having an open slot 21ª in its end in which is slidably mounted the stem 22 of journal-box 23, supporting thereon end of shaft 18. Block 21 is also formed with a vertical slot 24, and a lever 25 is mounted in said slot 24, secured to the end of stem 22 and fulcrumed in the lower prong of the block. This construction admits of throwing the pinion 20 into and out of gear with gear-wheel 15 by swinging lever 25 toward or away from said gear-wheel, a sliding-pawl 26 being mounted on the lever that engages notches 27 in the top of block 21 to hold the lever in its two positions.

Side-beam 4 is formed with an arch 28 near its forward end and a guide-frame 29 is secured below said arch to receive a vertically-adjustable frame 30, having a slotted rocking frame 31 journaled therein.

32 indicates a hoe, having its handle 32ª loosely mounted in rocking frame 31 and its end pivotally secured to a clip 33, with an angular extension 34 pivotally secured to disk 19.

It will be understood from this description that when the machine is in operation the rear end of the hoe handle 32ª describes a circle, and the hoe-blade is given an up and down and a motion toward and from the machine, the blade being thrown upwardly and away from the machine during one-half the rotation of disk 19 and then downwardly and toward the machine during the other one-half, the operation being similar to the operation of a hoe manually.

35 indicates a slotted lever engaging the handle 32, fulcrumed on cross-bar 36, secured to draft-pole 1, and side beam 4, and having a handle 37 extending removably therefrom within reach of the operator to enable him to guide the hoe-blade so that it cuts out the undesirable plants.

Guide-frame 29 has notches 29ª therein, and adjustable frame 30, spring-actuated pins 38 that engage said notches to hold the frame in a raised or lowered position, said pins being secured to a spool 39, revolubly mounted on supports 40, secured to the lower end of frame 30 by means of chains or other flexible members 41, said construction being such that when the spool is rotated the chains 41 are wrapped thereon and the pins 38 drawn out of engagement with notches 29ª, so that the frame 30 may be raised or lowered from its former position.

42 indicates a foot-lever fulcrumed on cross-beam 43, secured to draft-pole 1, and side beam 4, and secured to frame 30, 44 a spring actuated lever fulcrumed on the rear of foot-lever 42, and 45 a cord or wire connecting lever 44 and spool 39.

By this construction just described it will be understood that the hoe 32 may be raised and lowered by the operator as the condition of the work may require by placing his foot on foot-lever 42 and first pressing downwardly with his heel on lever 44, so as to rotate spool 39 and draw the pins 38 from engagement with notches 29ª, and then pressing downwardly on lever 42 to raise frame 30 or allowing the weight of the frame 30 and its connections to carry it downwardly, the operator easing the frame downwardly, so as to prevent jar thereto. As soon as the frame reaches its adjusted position, the pins 38 enter the notches 29ª opposite thereto and hold it in its new position.

Having thus described my invention, what I claim is—

1. In a cotton-chopper, a blade having a handle secured thereto, means secured to said handle to impart a reciprocating motion to said blade, and means to move the blade longitudinally, substantially as shown and described.

2. In a cotton-chopper, a blade having a handle, secured thereto, means secured to said handle to impart a reciprocating motion to said blade, and a slotted lever engaging said handle to move the blade longitudinally, substantially as shown and described.

3. In a cotton-chopper, the axle rotatably mounted, a disk geared to said axle, a chopping-blade having a handle secured to said disk, and means to move the blade longitudinally, substantially as shown and described.

4. In a cotton chopper, the axle rotatably mounted, a disk geared to said axle, a chopping-blade having a handle secured to said disk, and a slotted lever engaging said handle to move the blade longitudinally, substantially as shown and described.

5. In a cotton-chopper, a guide-frame having notches, a vertically adjustable frame mounted in said guide-frame, and having pins to engage said notches, a spool rotatably mounted on said adjustable frame, a chopping-blade having a handle slidably mounted in said adjustable frame, flexible members secured to said spool and to said pins, a foot-lever secured to said adjustable frame to raise and lower it, a spring-actuated lever secured to said foot-lever, and a flexible member connecting said spring-actuated lever and the spool to rotate it, substantially as shown and described.

6. In a cotton-chopper, the axle rotatably mounted, a gear-wheel secured to said axle, a shaft suitably journaled, a pinion secured to said shaft, and meshing with the gear-wheels aforesaid, a beveled gear-wheel secured to said shaft, a journal-box pivotally secured, a shaft journaled in said journal-box having a beveled pinion secured thereto to mesh with the beveled gear-wheel aforesaid, a disk on the last mentioned shaft, the chopping-blade having a handle pivotally secured to said disk, and means to swing said shaft and pivoted journal to move said beveled pinion into and out of gear with the beveled gear-wheel, substantially as shown and described.

7. In a cotton-chopper, the axle rotatably mounted, a gear-wheel secured to said axle, a shaft suitably journaled, a pinion secured to said shaft, and meshing with the gear-wheels aforesaid, a beveled gear-wheel secured to said shaft, a journal-box pivotally secured, a shaft journaled in said journal-box having a beveled pinion secured thereto to mesh with the beveled gear-wheel aforesaid, a disk on the last-mentioned shaft, the chopping-blade having a handle pivotally secured to said disk, a slotted block, a journal-box having a stem slidably mounted in said slotted block, and a lever secured to said stem, the shaft carrying the beveled pinion being journaled in said slidable journal-box, substantially as shown and described.

8. In a cotton-chopper, a draft-pole, a supporting frame secured to said draft-pole, the axle journaled on said frame, a gear-wheel secured to said axle, a shaft journaled on said frame having a pinion secured thereto and meshing with the gear-wheel aforesaid, a beveled gear secured to said shaft, a journal-box pivotally secured to said frame, a shaft journaled in said journal-box, a block secured to the draft-pole having a slot therein, a journal-box for supporting the last-mentioned shaft and having a stem slidably mounted in the slot in the block, a lever fulcrumed on said block and secured to said stem, a beveled pinion keyed to the last mentioned shaft and positioned to mesh with the beveled gear-wheel aforesaid, a disk secured to the same shaft, a guide-frame secured to said supporting frame, a frame adjustably mounted in said guide-frame, a foot-lever for adjusting said frame, a rocking-frame mounted in said adjustable frame, a chopping-blade having a handle mounted in said rocking frame, said handle being operatively secured to said disk, and a slotted lever fulcrumed in said supporting frame and engaging said handle, substantially as shown and described.

In witness whereof, I have hereunto set my hand in presence of two subscribing witnesses.

JESSE ROBERT GETSINGER.

Witnesses:
J. F. BURTON,
A. F. EARWILE, Jr.